United States Patent
Lambert

(10) Patent No.: US 8,677,779 B2
(45) Date of Patent: Mar. 25, 2014

(54) AIR CONDITIONER WITH SERIES/PARALLEL SECONDARY EVAPORATOR AND SINGLE EXPANSION VALVE

(75) Inventor: Steven L. Lambert, Washington, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 169 days.

(21) Appl. No.: 13/285,461

(22) Filed: Oct. 31, 2011

(65) Prior Publication Data
US 2013/0104589 A1 May 2, 2013

(51) Int. Cl.
*F25B 39/02* (2006.01)
*F25B 5/00* (2006.01)

(52) U.S. Cl.
USPC .................................. 62/504; 62/117; 62/199

(58) Field of Classification Search
USPC .............. 62/504, 199, 525, 117, 442, 197, 62/527–528, 95; 165/203, 208, 282, 165/296–297, DIG. 109, DIG. 110, 165/DIG. 113, 280, 283, 103
See application file for complete search history.

(56) References Cited

U.S. PATENT DOCUMENTS

| | | | | |
|---|---|---|---|---|
| 2,146,796 A | * | 2/1939 | Dasher | 62/95 |
| 4,711,095 A | * | 12/1987 | Howland et al. | 62/117 |
| 5,477,915 A | * | 12/1995 | Park | 165/206 |
| 6,266,968 B1 | | 7/2001 | Redlich | |
| 6,701,745 B1 | | 3/2004 | Kozinski | |
| 6,983,793 B2 | * | 1/2006 | Zheng et al. | 165/203 |
| 2007/0151287 A1 | | 7/2007 | Yahia et al. | |

FOREIGN PATENT DOCUMENTS

WO  WO2008085314 A2  7/2008

* cited by examiner

*Primary Examiner* — Cassey D Bauer
*Assistant Examiner* — Steve Tanenbaum
(74) *Attorney, Agent, or Firm* — Vichit Chea; MacMillan, Sobanski & Todd, LLC

(57) ABSTRACT

An air conditioning system has one expansion valve supplying refrigerant to two evaporators. A vapor quality of a refrigerant has an initial value at a primary inlet of a primary evaporator, and has a resultant value at the primary outlet. The primary evaporator has a bypass inlet at a first location where the vapor quality of the refrigerant is less than about 80% of the resultant value. A secondary evaporator has a secondary inlet receiving a bypass portion of the metered flow of refrigerant split-off at a second location of the primary evaporator between the first location and the expansion valve. The secondary outlet is connected to the bypass inlet. Thus, cooling can be achieved for two different zones using only one expansion valve.

9 Claims, 3 Drawing Sheets

AIR CONDITIONER WITH SERIES/PARALLEL SECONDARY EVAPORATOR AND SINGLE EXPANSION VALVE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates to a dual evaporator air conditioning system of a type useful in transportation vehicles and other applications.

Automotive air conditioning systems employ a compressor (typically driven by a combustion engine) and condenser mounted under the hood which are fluidically coupled to an HVAC case in the interior passenger compartment. The HVAC case includes a blower for circulating air and heat exchangers such as a heater core and an evaporator for conditioning the circulated air. In sedans and other vehicles having no more than two rows of seating, a single HVAC case is typically located behind the front instrument panel at a center line of the vehicle. Due to the relatively large size of the HVAC case, little space may be left behind the instrument panel for other components such as electronic accessories and storage bins. In order to convert the center stack area of the instrument panel to other uses, it is becoming desirable to break up the large HVAC case into two smaller HVAC cases to separately supply conditioned air at the driver side and the passenger side of the front instrument panel, respectively.

In larger vehicles with three or more seating rows, a single HVAC case may be unable to efficiently condition air to all areas of the vehicle. Furthermore, there has been a trend toward providing individually-controlled comfort functions in different zones or seating positions (e.g., giving rear seat passengers separate temperature and blower controls). This has led to the use of auxiliary HVAC cases disposed in a rear seating area, for example. Each separate HVAC case includes a respective blower and evaporator to separately cool the respective airflows according to separate demands.

The air conditioning compressor supplies liquefied refrigerant to a thermal expansion valve (TXV), which meters an amount of refrigerant to the evaporator that achieves a target evaporator temperature. The separate evaporators in a dual evaporator system may have different cooling demands placed on them at any particular time. In conventional systems, the amount of refrigerant metered to an evaporator is controlled such that all the refrigerant reaches a vapor state by the time it exits the evaporator. In other words, the liquefied refrigerant has a low vapor quality entering the evaporator and has a vapor quality of substantially 100% when leaving the evaporator to return to the compressor. In order to meet this condition in each separate evaporator of a dual evaporator system, the liquid refrigerant arriving from the condenser is usually split into two paths that are individually controlled. For example, in U.S. Pat. No. 6,983,793, primary and auxiliary HVAC units receive separate supplies of refrigerant through respective TXVs. Each TXV is separately controlled according to the temperature of the respective evaporator.

Due to the expense of the TXV, it would be desirable to meter refrigerant to both evaporators from a single TXV. As shown in U.S. Patent Application Publication 2007/0151287A1, two evaporators receive refrigerant flow in parallel from a pressure reducer and a distribution valve that controls the relative proportion of refrigerant sent to each evaporator. The distribution valve is controlled based on the cooling loads of the evaporators. Special control algorithms are required along with separate sensors for measuring the temperatures of each evaporator. Thus, it would be desirable to implement a dual evaporator system with a single TXV without requiring additional valves or modifications to the control system or algorithms.

SUMMARY OF THE INVENTION

In one aspect of the invention, an air conditioning system comprises a compressor for compressing a refrigerant. An expansion valve is coupled to the compressor for providing a metered flow of the compressed refrigerant. A primary evaporator is provided for cooling a primary airflow which has a primary refrigerant path between a primary inlet and a primary outlet. The primary inlet is coupled to the expansion valve for receiving the metered flow of refrigerant. A vapor quality of the refrigerant has an initial value at the primary inlet and a resultant value at the primary outlet. The primary evaporator has a bypass inlet connected to the primary refrigerant path at a first location where the vapor quality of the refrigerant is less than about 80% of the resultant value. A secondary evaporator is provided for cooling a secondary airflow which has a secondary inlet and a secondary outlet. The secondary inlet receives a bypass portion of the metered flow of refrigerant split-off at a second location of the refrigerant path between the first location and the expansion valve. The secondary outlet is connected to the bypass inlet.

DETAILED DESCRIPTION OF PREFERRED EMBODIMENTS

Figure 1:
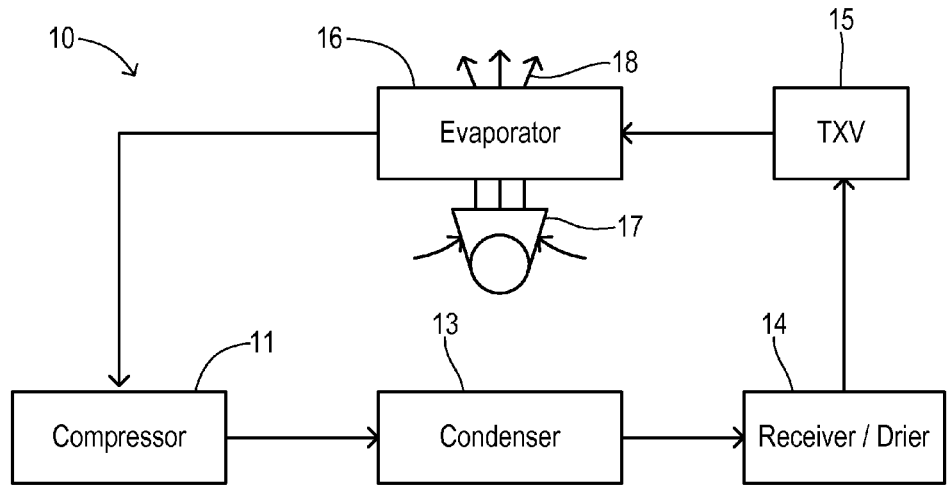
FIG. 1 is a block diagram showing the main components of a typical air conditioning system.

Referring now to FIG. 1, an air conditioning system 10 includes a compressor 11 (e.g., a variable displacement compressor or a clutch-driven compressor) compressing refrigerant and sending the refrigerant to a condenser 13. Condensed (i.e., liquefied) refrigerant from condenser 13 may be stored and dried in a receiver/drier 14 and then supplied to a thermal expansion valve (TXV) 15. The liquefied refrigerant is metered by TXV 15 to an evaporator 16 in which the refrigerant boils and then returns to compressor 13 as a vapor. A blower 17 passes air to be conditioned over evaporator 16 to provide a conditioned airflow 18, which may be directed via ducts and registers to an occupied space such as a room or a vehicle passenger compartment.

Figure 2:
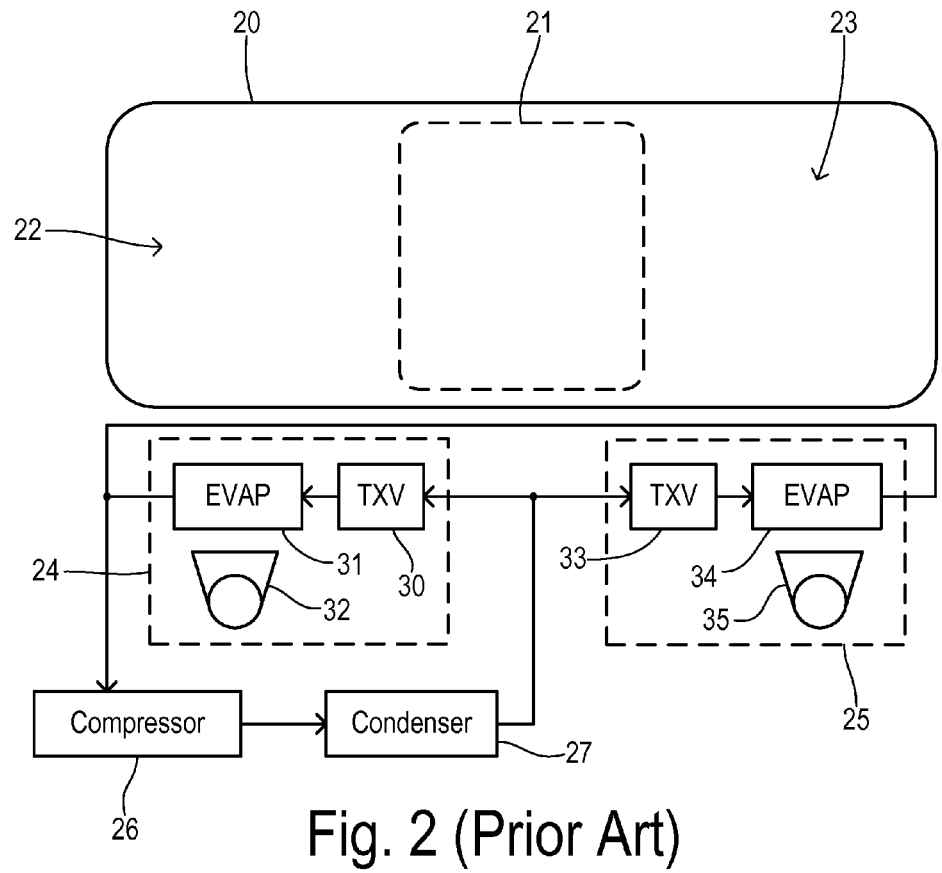
FIG. 2 is a block diagram showing a prior art dual evaporator system.

FIG. 2 shows an instrument panel 20 at the front of a transportation vehicle with a center stack area 21 between a first end 22 on a driver side and a second end 23 on a passenger side. A single main HVAC unit has conventionally occupied a center stack area 21. In FIG. 2, however, separate driver side and passenger side HVAC units 24 and 25 are utilized which have a reduced size to allow them to be installed in the instrument panel ends 22 and 23. A shared compressor 26 and condenser 27 provide refrigerant in parallel to HVAC units 24 and 25. Driver side unit 24 meters refrigerant through a TXV 30 to a driver side evaporator 31. A driver side blower 32 generates a driver side airflow. Refrigerant is metered by a TXV 33 to an evaporator 34 in the passenger side unit 25. Passenger side blower 35 generates a separate passenger airflow so that independent cooling is provided to the driver and passenger. However, the cost of the TXV and separate feedback controls are duplicated.

Figure 3:
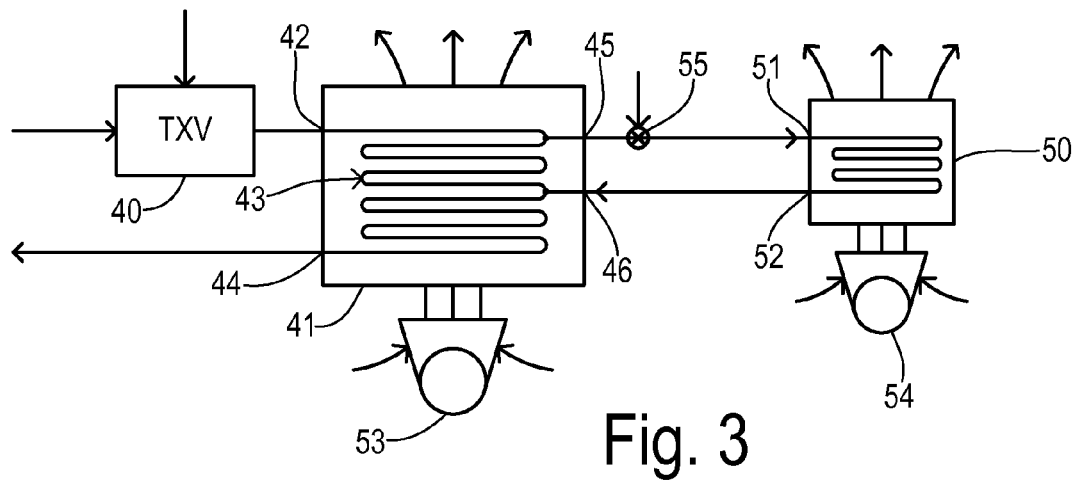
FIG. 3 is a block diagram showing one embodiment of a series/parallel dual evaporator configuration of the present invention.

The present invention as shown in FIG. 3 achieves a significant cost benefit by avoiding a separate TXV on the second evaporator. A main feature of the invention involves plumbing the refrigerant from the primary evaporator to a secondary evaporator at a strategic point where refrigerant is boiling from a highly concentrated liquid mixture. After the split, each flow continues to boil while traversing the primary path and a bypass path through the respective evaporators. Boiling in the secondary evaporator provides a desired cooling, but the refrigerant leaves the secondary evaporator while still containing a moderate concentration of liquid. This parallel, bypass flow through the second evaporator rejoins the primary flow in the primary evaporator at a location in the primary evaporator somewhat ahead of or upstream of the primary outlet. The combined refrigerant flow continues to boil in the remainder of the primary evaporator and reaches a complete vapor state by the time it leaves the primary evaporator. Thus, the secondary (bypass) evaporator flow is in parallel with a first portion of the primary evaporator and in series with a second portion of the primary evaporator. Refrigerant for the bypass leaves the primary evaporator flow at a location corresponding to less than or equal to about 35% vapor quality and returns from the bypass to the primary evaporator flow at a location corresponding to between about 65% and about 80% vapor quality.

FIG. 3 shows a TXV 40 providing a metered flow of compressed refrigerant to a primary inlet 42 of a primary evaporator 41. Evaporator 41 has a refrigerant path 43 extending from primary inlet 42 to a primary outlet 44. The vapor quality of the refrigerant has an initial value at primary inlet 42 of about 20% or lower (i.e., mostly liquid state). After boiling in the primary evaporator 41, the refrigerant has a vapor quality equal to a resultant value at the primary outlet, wherein the resultant value is typically controlled to be substantially 100% (i.e., all vapor).

Primary evaporator 41 has a bypass outlet 45 coupled to a secondary inlet 51 of a secondary evaporator 50. Refrigerant passes through secondary evaporator 50 to a secondary outlet 52, which is coupled to a bypass inlet 46 on primary evaporator 41. Bypass inlet 46 is at a location along path 43 where the vapor quality of refrigerant in primary evaporator 41 is less than a value which is 20% below the resultant value (e.g., less than about 80% vapor quality). This location ensures that refrigerant returning from having bypassed through secondary evaporator 50 has sufficient opportunity in primary evaporator 41 to complete its boiling prior to exiting primary evaporator 41.

Bypass outlet 45 may be downstream from primary inlet 42 or the two may be coupled to the same location in the flow. In any case, the bypass flow should be removed (i.e., bypassed) from the primary flow at a point where the vapor quality of the primary flow is less than or equal to 35%. This is to ensure sufficient liquid content available to boil in secondary evaporator 50.

In the system shown in FIG. 3, it may be most convenient to provide greater cooling capacity in the primary evaporator than in the secondary evaporator. Thus, primary evaporator 41 may be preferably deployed on a driver side of a vehicle with secondary evaporator 50 being deployed on a passenger side since the driver side HVAC would be more frequently in use. A primary blower 53 generates a primary airflow through evaporator 41 and a secondary blower 54 generates a secondary airflow through secondary evaporator 50. When there is no cooling demand on secondary evaporator 50 (e.g., when no airflow is being generated by blower 54 because the passenger seat is empty), little boiling of refrigerant would occur in evaporator 50. Nevertheless, system operation continues at an acceptable level since the unboiled refrigerant returns to primary evaporator 41 with a sufficient distance to traverse in evaporator 41 to allow complete boiling.

In an alternative embodiment, a shut-off valve 55 may be provided in a bypass line between primary evaporator 41 and secondary evaporator 50 to restrict the actual refrigerant flow to be just within primary evaporator 41 when there is no demand on the secondary HVAC case.

Figure 4:
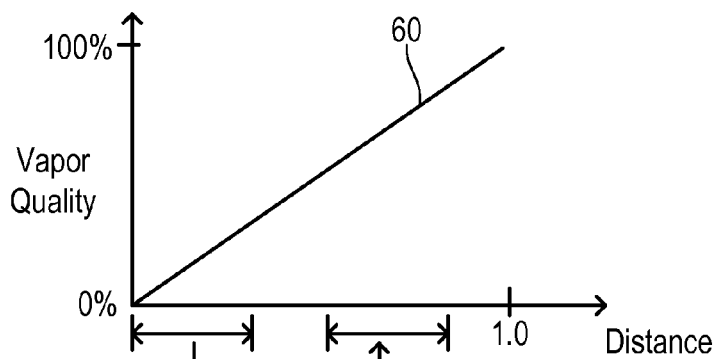
FIG. 4 is a plot showing the changing vapor quality of refrigerant flowing through an evaporator.

FIG. 4 plots a line 60 showing the increasing vapor quality as refrigerant traverses the refrigerant path within the primary evaporator. Within an initial range of vapor quality as the refrigerant traverses an initial section of the refrigerant path, a bypass flow is removed or diverted. The diversion may preferably occur after the refrigerant has flowed a certain distance within the primary evaporator, but it could also be diverted prior to entering the primary evaporator (e.g., at the primary inlet fitting). As shown in FIG. 4, the bypass flow re-enters the primary refrigerant path where the vapor quality is in a range between about 65% and 80%.

Figure 5:
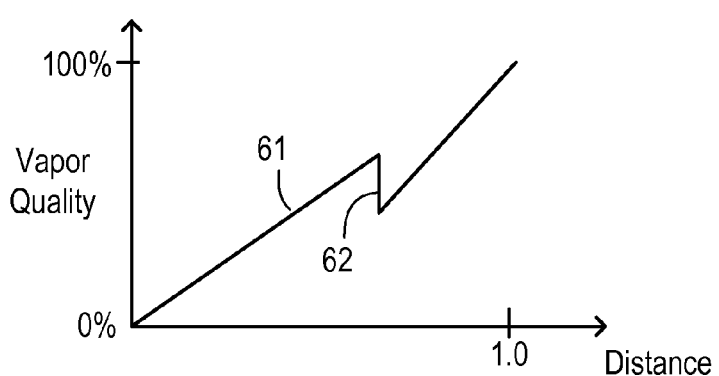
FIG. 5 is a plot showing one example of the changing vapor quality in the primary evaporator of the present invention.

As shown in FIG. 5, a line 61 shows a modification of the actual vapor quality when a bypass flow of a higher liquid concentration is returned to the primary evaporator. A drop 62 occurs at the bypass inlet when the bypass portion of the refrigerant from the second evaporator is combined with the primary flow. A vapor quality of 100% is still obtained by the time the refrigerant has traversed the full distance of the refrigerant path to the primary outlet.

Figure 6:
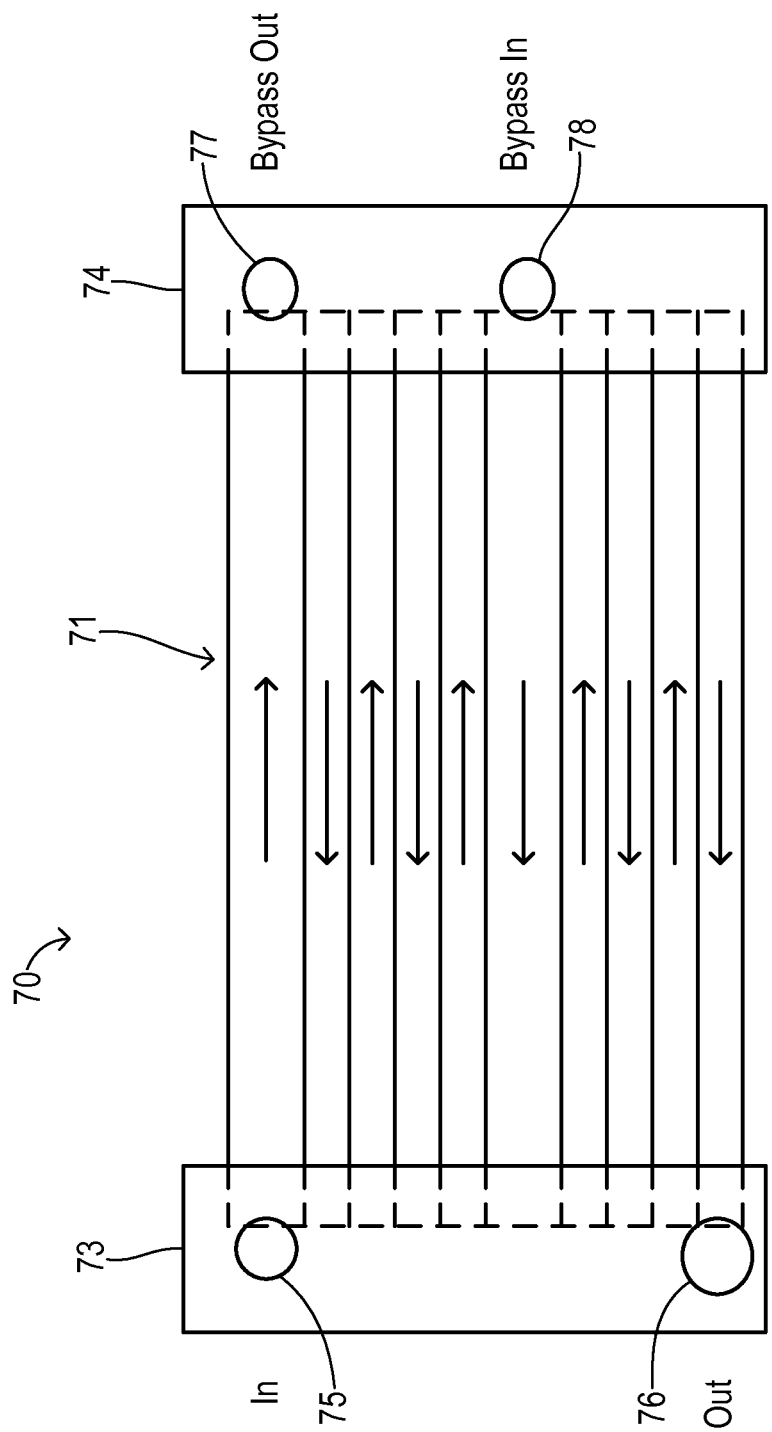
FIG. 6 is a schematic illustration of one embodiment of a primary evaporator.

FIG. 6 shows a primary evaporator 70 with a plurality of heat exchanger tubes 71 deployed between heads 73 and 74. A primary inlet 75 in head 73 receives refrigerant which passes through tubes 71 to an outlet 76 in a conventional manner. A bypass outlet 77 in head 74 includes a fitting for receiving a fluid line to couple a bypass flow to the secondary evaporator. A bypass inlet 78 likewise includes a fitting for receiving a return flow of refrigerant from the secondary evaporator. The cross-sectional size of tubes 71 corresponding with the return of refrigerant at bypass inlet 78 may be greater than the tubes carrying flow immediately upstream from inlet 78 due to the increased amount of refrigerant and the potentially increased liquid concentration.

What is claimed is:
1. An air conditioning system comprising:
a compressor for compressing a refrigerant;
an expansion valve coupled to the compressor for providing a metered flow of the compressed refrigerant;
a primary evaporator for cooling a primary airflow and having a primary refrigerant path between a primary inlet and a primary outlet, wherein the primary inlet is coupled to the expansion valve for receiving the metered flow of refrigerant, wherein a vapor quality of the refrigerant has an initial value at the primary inlet and a resultant value at the primary outlet, and wherein the primary evaporator has a bypass inlet connected to the primary refrigerant path at a first location where the vapor quality of the refrigerant is less than 80% of the resultant value; and a secondary evaporator for cooling a secondary airflow and having a secondary inlet and a secondary outlet, wherein the secondary inlet receives a bypass portion of the metered flow of refrigerant split-off at a second location of the refrigerant path between the first location and the expansion valve, and wherein the secondary outlet is connected to the bypass inlet.

2. The system of claim 1 wherein the resultant value is substantially 100% vapor.

3. The system of claim 1 wherein the second location corresponds to a vapor quality less than 35%.

4. The system of claim 1 further comprising a shutoff valve for selectably shutting off the bypass portion.

5. The system of claim 1 further comprising:

a primary blower for directing the primary airflow to a primary comfort zone;

a secondary blower for directing the secondary airflow to a secondary comfort zone; and refrigerant lines for coupling the bypass portion the secondary inlet and coupling the secondary outlet to the bypass inlet, so that the primary and secondary evaporators are in thermal communication with the primary and secondary comfort zones, respectively.

6. An air conditioning system in a passenger vehicle having a driver comfort zone and a passenger comfort zone, comprising:

a compressor for compressing a refrigerant;

an expansion valve coupled to the compressor for providing a metered flow of the compressed refrigerant;

a primary blower for directing a primary airflow to the driver comfort zone;

a secondary blower for directing a secondary airflow to the passenger comfort zone;

a primary evaporator for cooling the primary airflow and having a primary refrigerant path between a primary inlet and a primary outlet, wherein the primary inlet is coupled to the expansion valve for receiving the metered flow of refrigerant, wherein a vapor quality of the refrigerant has an initial value at the primary inlet and a resultant value at the primary outlet, and wherein the primary evaporator has a bypass inlet connected to the primary refrigerant path at a first location where the vapor quality of the refrigerant is less than 80% of the resultant value; and a secondary evaporator for cooling the secondary airflow and having a secondary inlet and a secondary outlet, wherein the secondary inlet receives a bypass portion of the metered flow of refrigerant split-off at a second location of the refrigerant path between the first location and the expansion valve, and wherein the secondary outlet is connected to the bypass inlet.

7. The system of claim 6 wherein the resultant value is substantially 100% vapor.

8. The system of claim 6 wherein the second location corresponds to a vapor quality less than 35%.

9. The system of claim 6 further comprising a shutoff valve for selectably shutting off the bypass portion.

* * * * *